United States Patent
Khojastepour et al.

(10) Patent No.: US 9,014,290 B2
(45) Date of Patent: Apr. 21, 2015

(54) THROUGHPUT ENHANCEMENT THROUGH REPERCUSSIVE CODING IN MIMO SYSTEMS

(71) Applicant: NEC Laboratories America, Inc., Princeton, NJ (US)

(72) Inventors: Mohammad A. Khojastepour, Lawrenceville, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/082,695

(22) Filed: Nov. 18, 2013

(65) Prior Publication Data

US 2014/0140428 A1 May 22, 2014

Related U.S. Application Data

(60) Provisional application No. 61/728,499, filed on Nov. 20, 2012.

(51) Int. Cl.
*H04B 7/02* (2006.01)
*H04L 25/03* (2006.01)
*H04B 7/04* (2006.01)
*H04B 7/06* (2006.01)

(52) U.S. Cl.
CPC .... *H04L 25/03955* (2013.01); *H04L 25/03898* (2013.01); *H04B 7/0417* (2013.01); *H04B 7/0639* (2013.01)

(58) Field of Classification Search
USPC .......... 375/267, 260, 219, 222; 370/204, 252
See application file for complete search history.

(56) References Cited

U.S. PATENT DOCUMENTS

| | | | | |
|---|---|---|---|---|
| 8,213,527 | B2 * | 7/2012 | Wang et al. | 375/267 |
| 2008/0195363 | A1 * | 8/2008 | Lytollis | 703/3 |
| 2009/0225646 | A1 * | 9/2009 | Dayal et al. | 370/204 |
| 2009/0265601 | A1 * | 10/2009 | Mielczarek et al. | 714/799 |

OTHER PUBLICATIONS

Ozarow, L. "The Capacity of the White Gaussian Multiple Access Channel with Feedback," IEEE Transactions on Information Theory, vol. IT-30, No. 4, Jul. 1984, pp. 623-629.

Ozarow, L. "An Achievable Region and Outer bound for the Gaussian Broadcast Channel with Feedback" IEEE Transactions on Information Theory, vol. IT-30, No. 4, Jul. 1984, pp. 667-671.

(Continued)

*Primary Examiner* — Eva Puente
(74) *Attorney, Agent, or Firm* — Joseph Kolodka

(57) ABSTRACT

There is provided a method performed by a transmitter in a multi-user communication system. The method includes transmitting a first part of a codeword to a plurality of receivers over a communication channel in a transmission. The method further includes receiving feedback on the transmission of the first part of the codeword. The method also includes providing an artificial channel having channel parameters adjustable responsive to the received feedback. The method additionally includes virtually feeding the artificial channel with the first part of the codeword to generate artificial channel output data. The method further includes encoding a second part of the codeword for transmission to the plurality of receivers over the communication channel responsive to the artificial channel output data. The method also includes transmitting the encoded signals to the plurality of receivers over the communication channel.

20 Claims, 8 Drawing Sheets

(56) References Cited

OTHER PUBLICATIONS

Schalkwijk et al., "A Coding Scheme for Additive Noise Channels with Feedback—Part I: No Bandwidth Constraint," IEEE Transactions on Information Theory, vol. IT-12, No. 2, Apr. 1966, pp. 172-182.

Schalkwijk et al., "A Coding Scheme for Additive Noise Channels with Feedback—Part II: Band-Limited Signals," IEEE Transactions on Information Theory, vol. IT-12, No. 2, Apr. 1966, pp. 183-189.

* cited by examiner

THROUGHPUT ENHANCEMENT THROUGH REPERCUSSIVE CODING IN MIMO SYSTEMS

RELATED APPLICATION INFORMATION

This application claims priority to provisional application Ser. No. 61/728,499 filed on Nov. 20, 2012, incorporated herein by reference.

BACKGROUND

1. Technical Field

The present invention relates to signal processing, and more particularly to throughput enhancement through repercussive coding in multiple-input, multiple-output (MIMO) systems.

2. Description of the Related Art

In multiple user communication systems, the quality of the channel state information at the transmitter is very important to performing closed loop operation. Unlike single user systems where the quality of the channel estimate only effects the coding gain and not the scaling with the Signal-To-Noise Ratio (SNR), in multiple user systems the system performance would be quite limited if the channel state information is not precise.

There are two types of imprecision in the knowledge of the channel state. One type of imprecision is the channel estimation error and the other type of imprecision is the delay in this information due to the causality of the system. It turns out that in a system which can have quite good channel estimation, the latter problem with the delay still causes unrecoverable error and severely limited performance if proper coding is not used.

SUMMARY

These and other drawbacks and disadvantages of the prior art are addressed by the present principles, which are directed to throughput enhancement through repercussive coding in multiple-input, multiple-output (MIMO) systems.

According to an aspect of the present principles, there is provided a method performed by a transmitter in a multi-user communication system. The method includes transmitting a first part of a codeword to a plurality of receivers over a communication channel in a transmission. The method further includes receiving feedback on the transmission of the first part of the codeword. The method also includes providing an artificial channel having channel parameters adjustable responsive to the received feedback. The method additionally includes virtually feeding the artificial channel with the first part of the codeword to generate artificial channel output data. The method further includes encoding a second part of the codeword for transmission to the plurality of receivers over the communication channel responsive to the artificial channel output data. The method also includes transmitting the encoded signals to the plurality of receivers over the communication channel.

According to another aspect of the present principles, there is provided an apparatus in a multi-user communication system. The apparatus includes a transmitter for transmitting a first part of a codeword to a plurality of receivers over a communication channel in a transmission. The apparatus further includes an artificial channel generator for receiving feedback on the transmission of the first part of the codeword, providing an artificial channel having channel parameters adjustable responsive to the received feedback, and virtually feeding the artificial channel with the first part of the codeword to generate artificial channel output data. The apparatus also includes an encoder for encoding a second part of the codeword for transmission to the plurality of receivers over the communication channel responsive to the artificial channel output data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to throughput enhancement through repercussive coding in multiple-input, multiple-output (MIMO) systems In an embodiment, an encoding method is proposed in which an encoder has access to some observation of the channel output in which the code is used. The observation could be in form of actual feedback of the channel output or a quantized version of the channel output. In another embodiment directed to a less restricted case, only partial knowledge of the channel output such as the channel characteristics might be available through a feedback link. In the latter situation, the present principles build an artificial channel where the characteristics of the original channel are used to generate this artificial channel. The artificial channel is then virtually fed by the transmitter with the same transmitted data and the output of this artificial channel is used in the encoding process. Since the characteristics of the actual channel may change during the transmission, the artificial channel will follow these changes after they become available to the transmitter. Due to the property of the code in dynamically looking back into itself, the technique described herein is referred to as repercussive coding.

Figure 1:
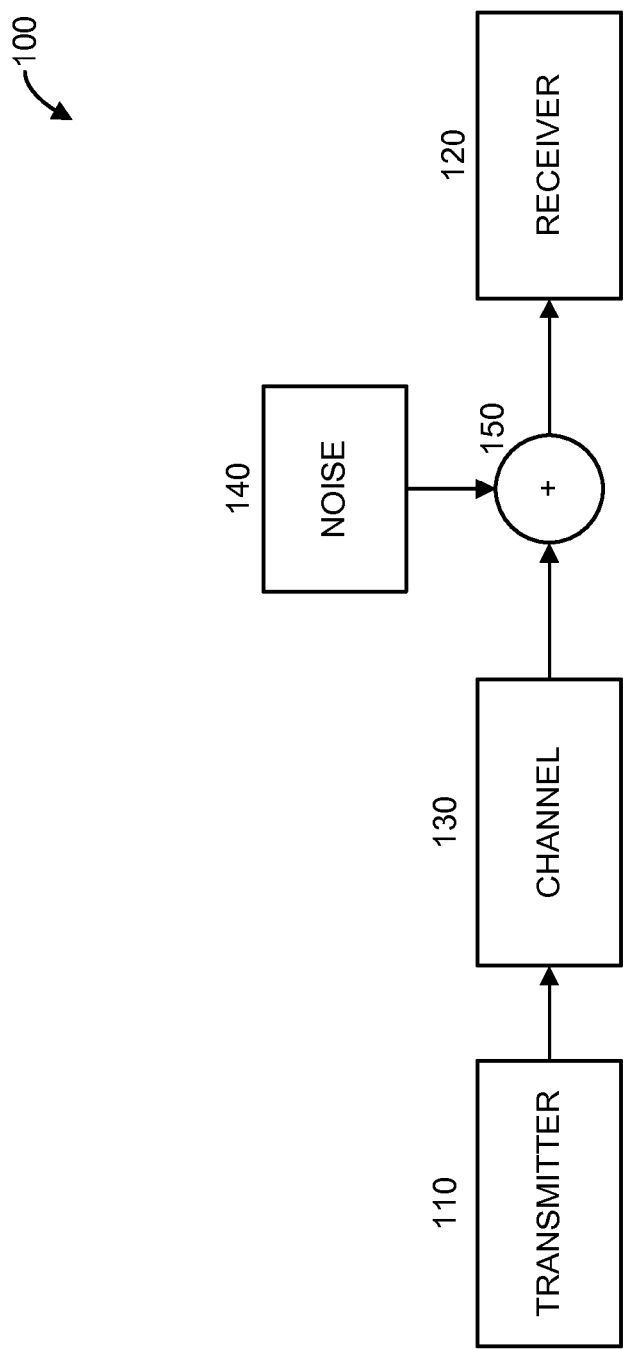
FIG. 1 shows a communication system 100 without feedback.
Figure 2:
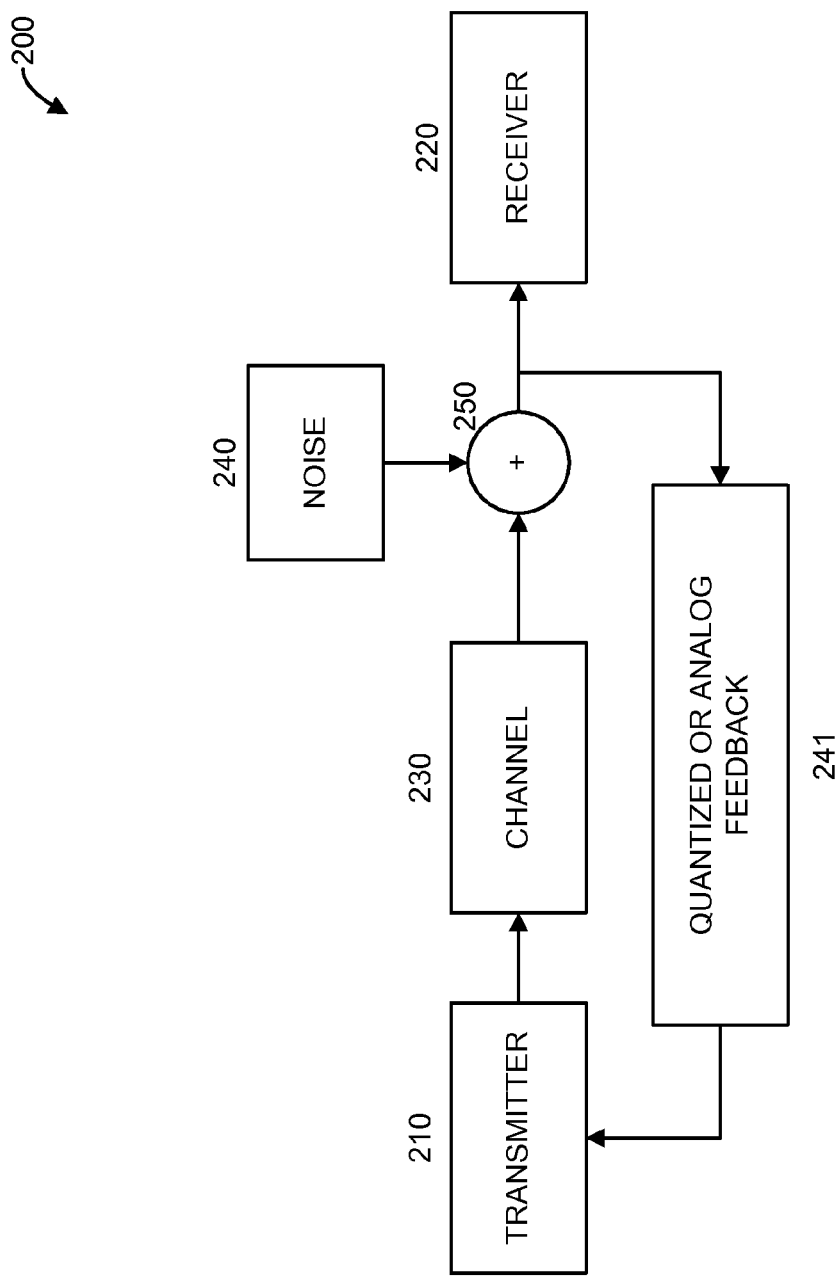
FIG. 2 shows a communication system 200 with feedback.

Feedback plays a very important role in communication systems, particularly to achieve an efficient performance of the communication links. FIG. 1 shows a communication system 100 without feedback. The system 100 includes a transmitter 110, a receiver 120, a channel 130, noise 140, and a combiner 150. The combiner 150 is indicative of the noise 140 being included in the channel 130. In a completely open loop communication system such as that shown in FIG. 1, the feedback is still used to acknowledge a correct reception of the packet (ACK) or request for additional transmission (NACK) of the same packet, say in Automatic Repeat Request (ARQ) systems, or incremental transmission which helps decoding of the previously transmitted packets, say in Hybrid Automatic Repeat Request (HARM) systems. In general, most communication systems require at least some minimal level of feedback regarding the condition of the channel (CSI: channel state information). This minimal feedback is usually the Channel Quality Index (CQI) and exists even in so called open loop operation in 3GPP standards. In a scalar channel, the CQI carries most of the knowledge about the channel. However, in multiple antenna systems, more precise information about the channel is signaled as quantized channel direction (PMI, Primary channel Matrix Index) in so called closed loop systems (FIG. 2). FIG. 2 shows a communication system 200 with feedback. The system 200 includes a transmitter 210, a receiver 220, a channel 230, noise 240, quantized or analog feedback 241, and a combiner 250. The combiner 250 is indicative of the noise 240 being included in the channel 230. It is alternatively possible to convey this information in an uplink channel through analog feedback or make use of the channel reciprocity in, for example, Time Division Duplex (TDD) systems to directly estimate the channel state information.

Figure 3:
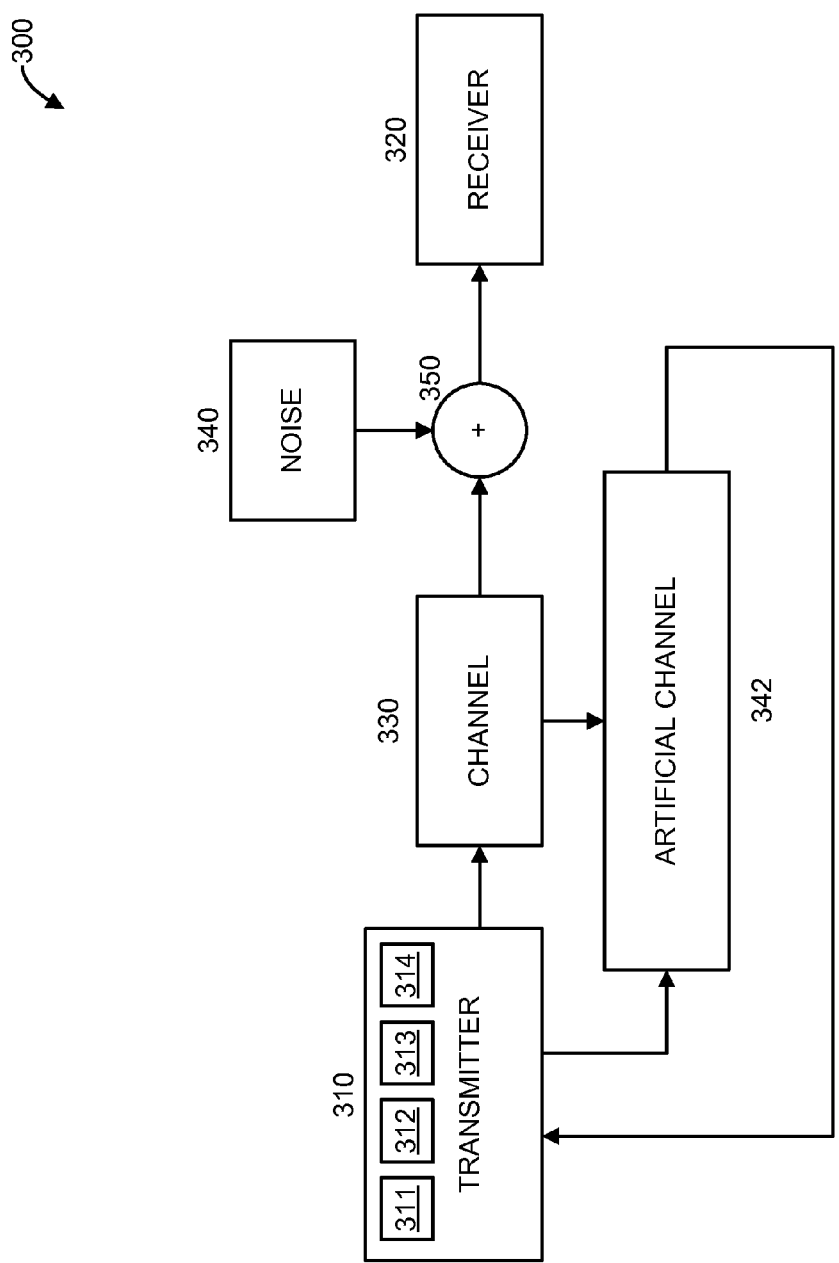
FIG. 3 shows a communication system 300 with an artificial channel and parameter feedback, in accordance with an embodiment of the present principles.

The feedback is proved to be very important in channels with changing characteristics (fading channels) or multi-user channels. However, the use of feedback in communication system is not limited to those channels. The knowledge of the received signal at the transmitter can be used to improve the decoding performance in a single user scalar channel even though it is theoretically proved that the channel capacity does not improve though feedback. In particular, it is possible to design much shorter codes with the same performance when the codes depend on the previous values of the received signals at the receiver. Therefore, if a feedback mechanism exists such code can improve the performance of the communication system. Nonetheless, the cost of the feedback has to be considered. We propose the use of repercussive coding where the transmitted codes dynamically depend on the one or more output of the channel or an artificial channel (see FIG. 3) that relates to the channel. The artificial channel is a virtual channel where its characteristics is a function of some parameters or characteristic of the actual channel but it is not necessarily equal to the actual channel. FIG. 3 shows a communication system 300 with an artificial channel and parameter feedback, in accordance with an embodiment of the present principles. The system 300 includes a transmitter 310, a receiver 320, a channel 330, noise 340, an artificial channel 342, and a combiner 350. The combiner 350 is indicative of the noise 340 being included in the channel 330. The transmitter 310 includes an encoder 311, an artificial channel generator 312, a modulator 313, and a MCS selector 314. The encoder 311 performs encoding (e.g., channel encoding). The modulator 313 performs modulation in preparation for transmission. The MCS selector 314 selects a modulation and coding scheme for the modulator 313 and encoder 311, respectively. The artificial channel generator 312 generates and/or otherwise provides (e.g., allocates) artificial channels for use as described herein. While shown as being included in the transmitter 310, in other embodiments any of the encoder 311, the artificial channel generator 312, and the modulator 313 can be implemented as separate elements with respect to the transmitter 310. These and other variations of the elements of FIG. 3 are readily contemplated by one of ordinary skill in the art given the teachings of the present principles provided herein, while maintaining the spirit of the present principles.

In practice, the feedback link is causal which means the transmitter only gets the knowledge of the received signal after some delay. Hence, we consider a coding where multiple packets are transmitted and each packet may depends on the data that is that is transmitted from the transmitter 310 to the receiver 320 as well as the received signals at the receiver 320 or the output of the artificial channel 342 for the prior packets.

A description will now be given of a channel model, in accordance with an embodiment of the present principles.

We consider one transmitter denoted by BS and multiple receivers denoted by UE1, UE2, . . . , etc. Let $H=[H_1; H_2; \ldots; H_K]$ denote the multi-user channel between a single transmitter (BS) with M antennas and K receivers (UE)'s with $N_k$, k=1, . . . , K antennas each where $H_k$ is $N_k \times M$ and H is formed by placing all the channel matrices on top of each other to form a $(\Sigma_{k=1}^{K} N_k) \times M$ matrix.

The received vector $y_k$ is given by the following:

$$y_k = H_k x + z_k \quad (1)$$

where x is the input vector of size M×1 and $z_k$ denotes the noise vector. For the combined channel of all the user the output signal y is a column vector of size $(\Sigma_{k=1}^{K} N_k) \times 1$ given by the following:

$$y = H_k x + z \quad (2)$$

where z is the combined noise vector of all users.

A description will now be given regarding repercussive coding, in accordance with an embodiment of the present principles.

The coding for multi-users includes creating one or more packets that depend on the combination of some user data. Consider K users with the data $s_k$ and channels $H_k(t)$, k=1 . . . , K at the time of transmission of packet t. Let X(t) denote the signal transmitted at time t that is an $M \times T_1$ matrix. The signal X(1) is a function of $s_k$, k=1, . . . , K and can be constructed as a linear combination of the coded or uncoded symbols intended for each receiver UE1, UE2, . . . . Let a(t) denotes the coded (or uncoded) portion of the signals $s_k$, k=1, . . . , K to be transmitted in packet t. Let $n_a(t)$ denote the length of the vector a(t). We first generate the vector x(t) as follows:

$$x(1) = A(1)a(1) + B(1)a^*(1) \quad (3)$$

where A(1) and B(1) are the encoding matrices of size $MT_1 \times n_a(1)$. The vector x(t) is then arranged into a $M \times T_1$ matrix that will be transmitted by M antennas in $T_1$ symbol duration that transmission of the packet 1 lasts. The process of generating a(t) also includes selecting a proper coding rate (if coding is used) and modulating by mapping the symbols to a proper constellation.

The modulation and coding scheme (MCS) is a function of the prior channel CQI reports from UE1, UE2, . . . . In some situations, the CQI report might not be available; hence, a predetermined modulation and coding scheme may be used. In some other situations, only the average CQI from UE1, UE2, . . . is available that can be used to select proper MCS. Please note that the reported CQI to the MCS mapping is not merely a one to one mapping (e.g., by using a look up table) as it is done conventionally in communication systems. The process of selecting a proper MCS depends on the next packet transmission and anticipation of the future channels and future coding process. For example, one can select a higher decoding error threshold and use a more aggressive rate for the transmission of the first packet and gradually select more or less decoding error threshold to allow more reliable transmission and decoding for the consequent packets.

After the first transmission has taken place, the receivers UE1, UE2, . . . estimate their channel and buffer the received signals. When all the transmission in one session of, e.g., p packets is finished, the decoding process uses the buffered data to perform decoding. After each transmission, the UE's also quantize the channel by using a predetermined precoding codebook and signal the index (PMI) to the transmitter. The receivers UE1, UE2, . . . also measure the channel quality and may provide this information to the BS in order to help the BS choose the MCS in future transmissions. The knowledge of the CQI in addition to the PMI at the BS can also help in efficiently allocating power between data streams. In some situations it is also possible to directly quantize the received signal and provide this information via a limited rate feedback link to the BS.

In the next time slot, i.e, t=2, different strategies can be used that can also depend on the availability of feedback data.

A first exemplary encoding scheme (S1) will now be described.

Figure 4:
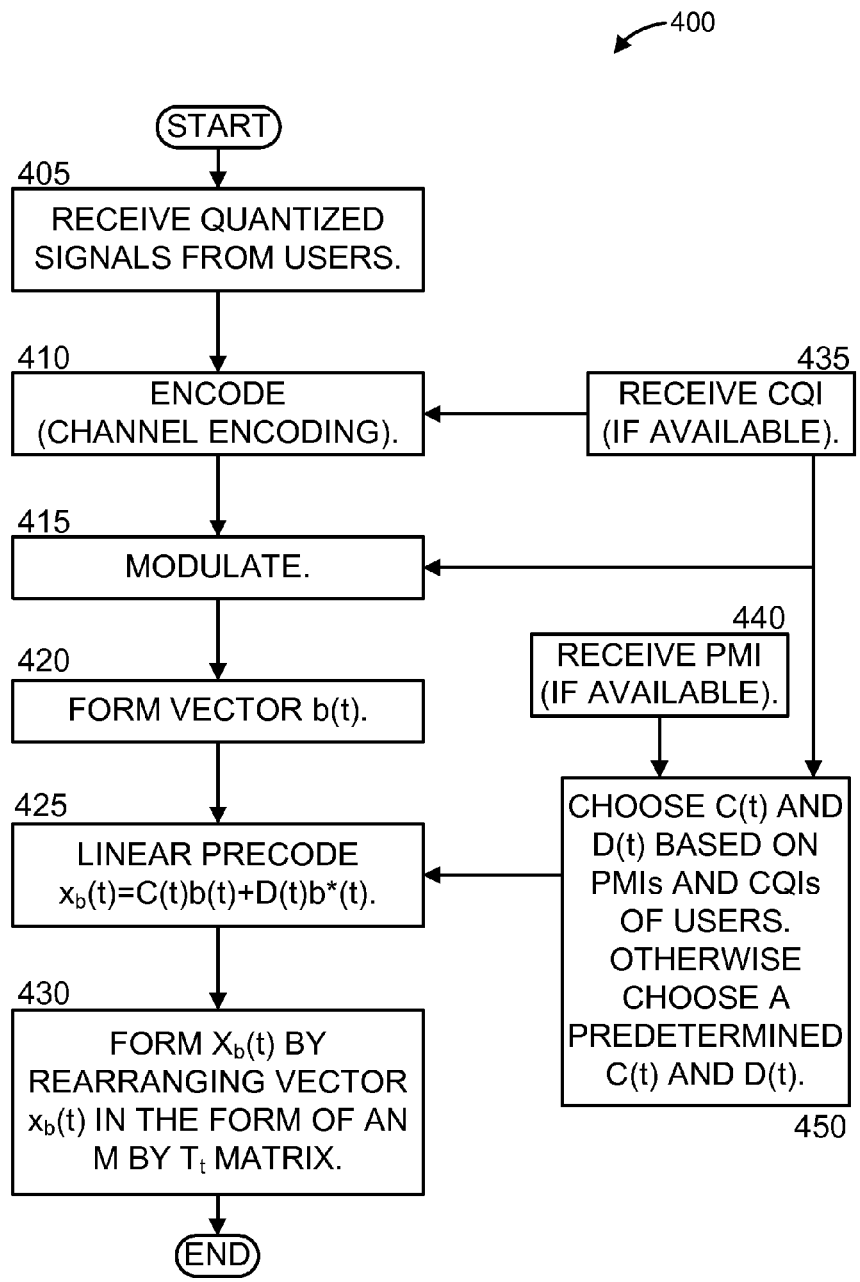
FIG. 4 shows a method 400 for repercussive encoding of old data based on a quantized channel output, in accordance with an embodiment of the present principles.

In the first exemplary encoding scheme (S1), the quantized version of the received signals is available at the transmitter, and the transmitter encodes it and then modulates it with proper coding rate and modulation scheme to generate b(2). Let $n_b(t)$ denote the length of the vector a(t). Once b(2) is generated, we then generate the vector as follows:

$$x_b(t)=C(t)b(t)+D(t)b^*(t) \quad (4)$$

where C(t) and D(t) are the encoding matrices at time t, say t=2, and they are both of size $MT_t \times n_b(t)$. The vector x(t) is then arranged into $M \times T_t$ matrix $X_b(t)$ that will be transmitted by M antennas of BS in $T_t$ symbol duration that transmission of the packet t lasts, for example for t=2. FIG. 4 shows a method 400 for repercussive encoding of old data based on a quantized channel output, in accordance with an embodiment of the present principles. The method 400 corresponds to the first examplary scheme. At step 405, receive quantized signals from users. At step 410, perform channel encoding to encode the quantized received signal. At step 415, modulate the encoded signal. At step 420, form vector b(t). At step 425, perform a linear precode such that $x_b(t)=C(t)b(t)+D(t)b^*(t)$. At step 430, form $x_b(t)$ by rearranging vector $x_b(t)$ in the form of an M by $T_t$ matrix. At step 435, receive the Channel Quality Index (CQI), if available. At step 440, receive the Primary channel Matrix Index (PMI). At step 445, choose C(t) and D(t) based on PMIs and CQIs of users. Otherwise, choose a predetermined C(t) and D(t).

A second exemplary encoding scheme (S2) will now be described.

Figure 5:
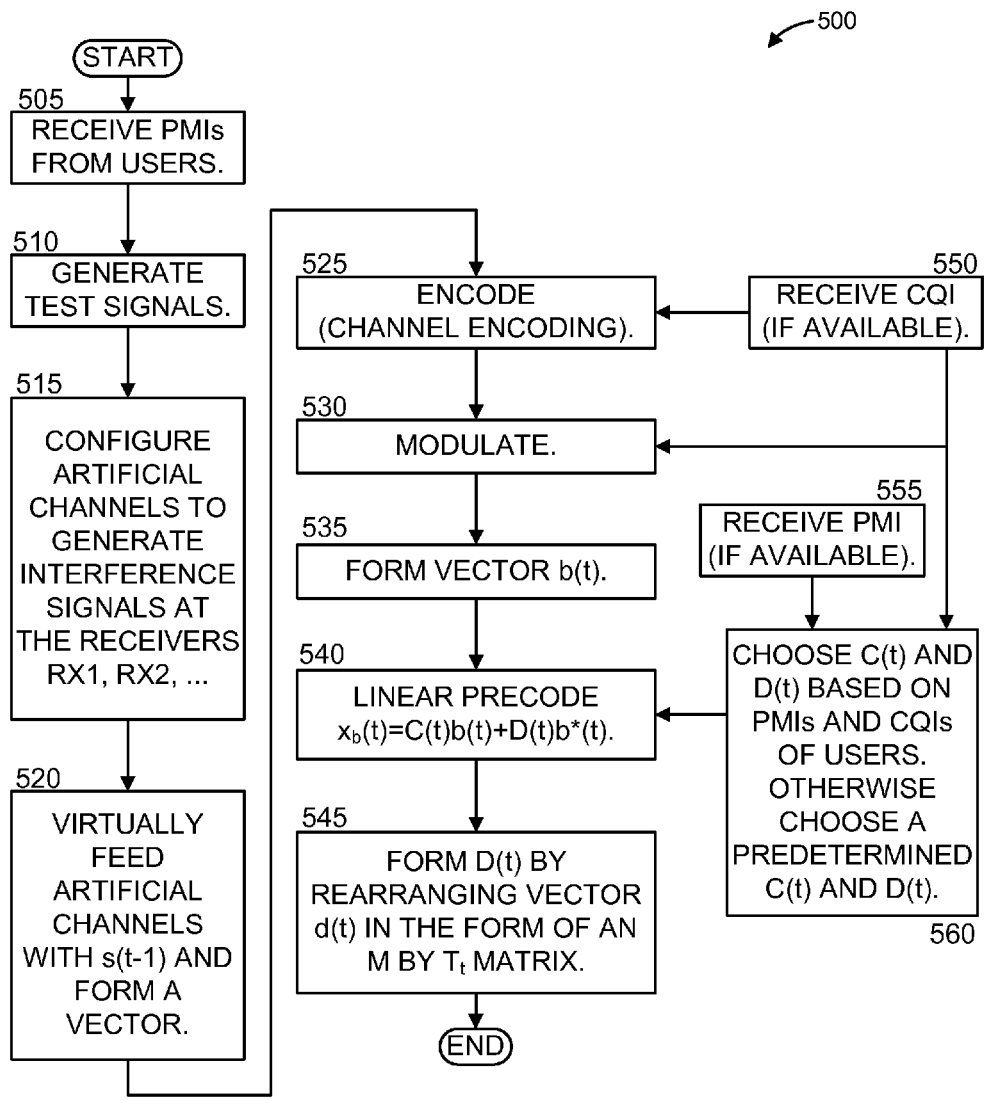
FIG. 5 shows a method 500 for repercussive encoding of old data based on an artificial channel, in accordance with an embodiment of the present principles.

The second exemplary encoding scheme (S2) relates to the case that only a quantized version of the channel is available, where we use the artificial channel having channel coefficients based on the quantized information available to the BS. The output of this artificial channel is known to the BS because the BS knows the quantized channel information as well as the transmitted symbols in time slot 1 where the first packet was transmitted. In one particular case, it is possible to generate an artificial channel with multiple outputs where each output corresponds to the interference seen by one of the receivers UE1, UE2, . . . , where a quantized channel is used instead of the actual channel. The output of the artificial channel is then encoded with a proper coding rate and modulation scheme to generate b(2). The vector $x_b(t)$ and the matrix $X_b(t)$ of the signals to be transmitted are then generated as discussed in the first examplary scheme (S1). FIG. 5 shows a method 500 for repercussive encoding of old data based on an artificial channel, in accordance with an embodiment of the present principles. The method 500 corresponds to the second examplary scheme. At step 505, receive the Primary channel Matrix Indexes (PMIs) from users. At step 510, generate artificial channels. At step 515, configure the artificial channels to generate interference signals at the receivers RX1, RX2, . . . . At step 520, virtually feed the artificial channels with s(t−1) and form a vector. At step 525, perform channel encoding. At step 530, modulate the encoded signal. At step 535, form vector b(t). At step 540, perform a linear precode such that $x_b(t)=C(t)b(t)+D(t)b^*(t)$. At step 545, form D(t) by rearranging vector d(t) in the form of an M by $T_t$ matrix. At step 550, receive the Channel Quality Index (CQI), if available. At step 555, receive the Primary channel Matrix Index (PMI). At step 560, choose C(t) and D(t) based on PMIs and CQIs of users. Otherwise, choose a predetermined C(t) and D(t).

A third exemplary encoding scheme (S3) will now be described.

In the third exemplary encoding scheme (S3), it is also possible to encode some new information and combine the new information with the retransmission signal described in (S1) and (S2). The new signal can be put into the vector a(2). In this case, the new information is a coded version of parts of the information intended for the users, i.e., $s_k$, k=1, . . . , K where a proper coding scheme and coding rate as well as proper modulation based on the prior CQI is used. The vector $x_a(t)$ and the matrix $X_a(t)$ of the signals to be transmitted, for example for t=2, are then generated as follows:

$$x_a(t)=A(t)a(t)+B(t)a^*(t) \quad (5)$$

where A(t) and B(t) are the encoding matrices of size $MT_t \times n_a(t)$ each.

Figure 6:
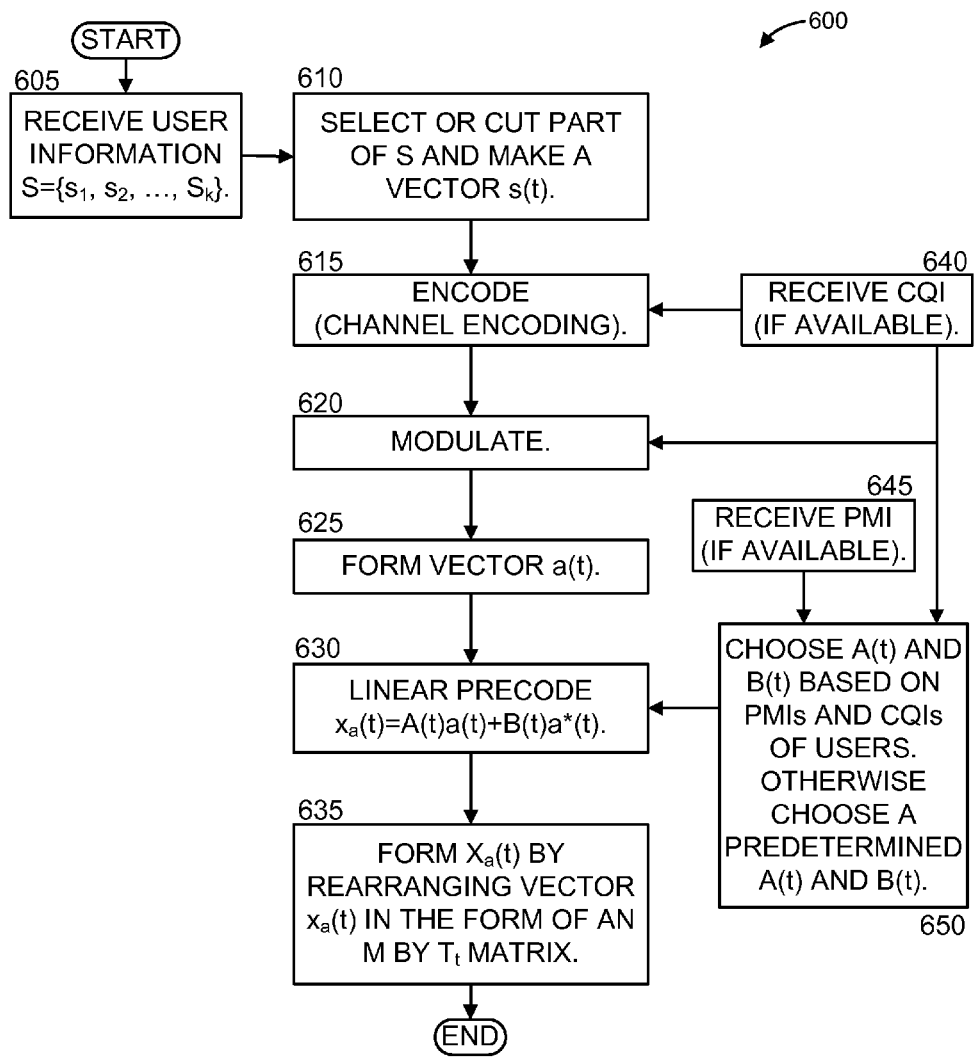
FIG. 6 shows a method 600 for encoding new data, in accordance with an embodiment of the present principles.

FIG. 6 shows a method 600 for encoding new data, in accordance with an embodiment of the present principles. The method 600 corresponds to the third examplary scheme. At step 605, receive user information (S={$s_1, s_2, \ldots, s_k$}. At step 610, select or cust part of S and make a vector s(t). At step 615, perform channel encoding. At step 620, modulate the encoded signal. At step 625, form vector a(t). At step 630, perform a linear precode such that $x_a(t)=A(t)a(t)+B(t)a^*(t)$. At step 635, form $X_a(t)$ by rearranging vector $X_a(t)$ in the form of an M by $T_t$ matrix. At step 640, receive the Channel Quality Index (CQI), if available. At step 645, receive the Primary channel Matrix Index (PMI). At step 650, choose A(t) and B(t) based on PMIs and CQIs of users. Otherwise, choose a predetermined A(t) and B(t).

We note that when PMI is available and the channel is quasi-static, meaning that the channel for the next packet transmission is closely approximated with the corresponding codebook matrix indicated by the reported PMI, then it is possible to use precoding for the transmission in the next time slot and enhance the communication rate and decoding performance of the system. In this case, it is possible to use precoding to encode the output of the artificial channel described in scheme (S2). It is also possible to combine new information in the transmission of packet 2 by using precoding. Therefore, there could be two more strategies as follows A fourth exemplary encoding scheme (S4) will now be described.

In the fourth exemplary encoding scheme (S4), after generating b(2) as in scheme (S2) it is possible to use multi-user precoding to convey this information by using the knowledge of the current channel CSI even if this knowledge is not perfect. Therefore the vector d(t) can be derived from b(t) as a part of b(t) or the whole b(t) to be transmitted using multi-user precoding. It is still possible to redefine the new b(t)

along with d(t) while b(t) is encoded though the scheme (S2) and a combined transmission will happen as discussed hereinafter. Let $n_d(t)$ denote the length of the vector d(t). We assume that the MCS selection for d(t) is done such that $mT_t \leq n_d(t)$ for some integer $m \leq M$. It is favorable to have $mT_t = n_d(t)$ which means that the code spans all of the transmission time slot for the packet t. Also, it is desired to use full streams, i.e., m=M if possible. The vector $x_d(t)$ and the matrix $X_d(t)$ of the signals to be transmitted are then generated as follows:

$$x_d(t) = (I_{N_t \times N_t} \otimes U(t)) d(t) \qquad (6)$$

where $\otimes$ denotes the Kronecker matrix product and U(t) is the multicast precoding matrix at time t, e.g., t=2, and it is size M×m. The vector x(t) is then arranged into M×$T_t$ matrix $X_b(t)$ by picking in the order of the columns, i.e., first m elements of x(t) constitute the first column of X(t), and the next m constitute the next column, and so forth.

Figure 7:
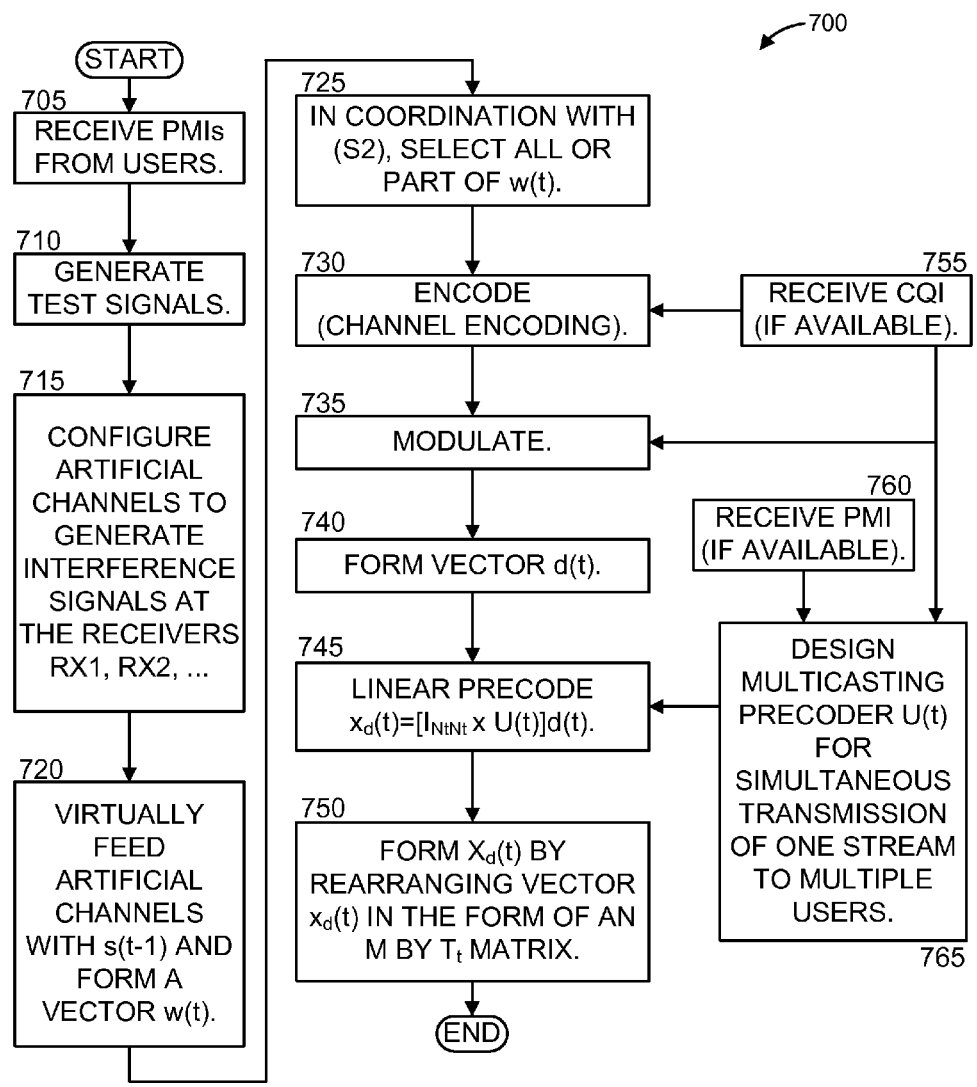
FIG. 7 shows a method 700 for repercussive encoding of old data based on an artificial channel using multicast precoding, in accordance with an embodiment of the present principles.

FIG. 7 shows a method 700 for repercussive encoding of old data based on an artificial channel using multicast precoding, in accordance with an embodiment of the present principles. The method 700 corresponds to the fourth examplary scheme. At step 705, receive the Primary channel Matrix Indexes (PMIs) from users. At step 710, generate artificial channels. At step 715, configure the artificial channels to generate interference signals at the receivers RX1, RX2, . . . . At step 720, virtually feed the artificial channels with s(t−1) and form a vector w(t). At step 725, in coordination with (S2), select all or part of w(t). At step 730, perform channel encoding. At step 735, modulate the encoded signal. At step 740, form vector d(t). At step 745, perform a linear precode such that $x_d(t) = [I_{N_t \times N_t} \times U(t)] d(t)$. At step 750, form $X_d(t)$ by rearranging vector d(t) in the form of an M by $T_t$ matrix. At step 755, receive the Channel Quality Index (CQI), if available. At step 760, receive the Primary channel Matrix Index (PMI). At step 765, design multicasting precoder U(t) for simultaneous transmission of one stream to multiple users.

A fifth exemplary encoding scheme (S5) will now be described.

In the fifth exemplary encoding scheme (S5), it is also possible to encode some new information using multi-user precoding by taking advantage of the knowledge of the current channel state. Similar to scheme (S4), we assume that the new information that is generated say in scheme (S3) is presented into two vectors a(t) and c(t). While the vector a(t) can be used in scheme (S3) for transmission without using the knowledge of the current channel state, one can build a transmission scheme for a c(t) portion of the new signal by using precoding. Let $n_c(t)$ denote the length of the vector c(t). We assume that the MCS selection for c(t) is done such that $mT_t \leq n_d(t)$ for some integer $m \leq M$. It is favorable to have $mn_d(t) = T_t$ which means that the code spans all of the transmission time slot for the packet t. Also, it is desired to use full streams, i.e., m=M if possible. We assume that the signals at the position i and j belong to the same stream for a particular user if i=j(mod m). This ensures that the stream dedicated to a user will be encoded by the same precoding vector during the transmission of packet t. The vector $x_c(t)$ and the matrix $X_c(t)$ of the signals to be transmitted are then generated as follows:

$$x_c(t) = (I_{N_t \times N_t} \otimes V(t)) c(t) \qquad (7)$$

where V(t) is the multi-user precoding matrix at time t, e.g., t=2, and it is size M×m. The vector x(t) is then arranged into a M×$T_t$ matrix $X_b(t)$ by picking in the order of the columns, i.e., first m elements of x(t) constitute the first column of X(t), and the next m constitute the next column, and so forth. We note that the precoder V(t) is designed such that the interferences of one stream on the other streams is limited and the precoder can, for example, maximize the weighted sum throughput. A simple choice of V(t) is to use zero forcing the elimination of the interference of all other streams to each user stream. Another possible choice is to use regularized zero forcing or the Minimum Mean Square Error (MMSE) precoder that is designed by constructing the MMSE filter assuming the role of transmitter and receivers are reversed.

Figure 8:
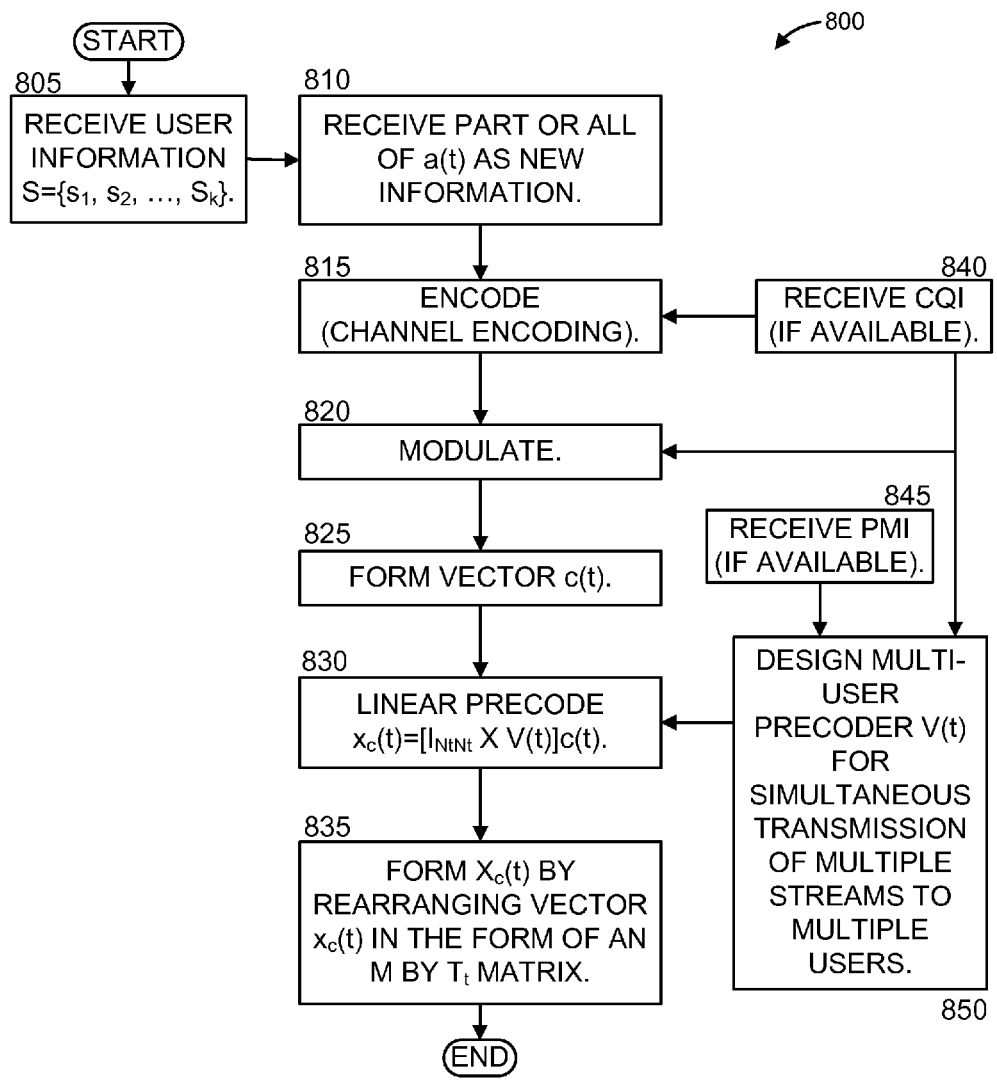
FIG. 8 shows a method 800 for repercussive encoding of new data using multi-user precoding, in accordance with an embodiment of the present principles.

FIG. 8 shows a method 800 for repercussive encoding of new data using multi-user precoding, in accordance with an embodiment of the present principles. The method 800 corresponds to the fifth examplary scheme. At step 805, receive user information (S={$s_1, s_2, \ldots, s_k$}). At step 810, receive part or all of a(t) as new information. At step 815, perform channel encoding. At step 820, modulate the encoded signal. At step 825, form vector c(t). At step 830, perform a linear precode such that $x_c(t) = [I_{N_t \times N_t} \times U(t)] c(t)$. At step 835, form $X_c(t)$ by rearranging vector $x_c(t)$ in the form of an M by $T_t$ matrix. At step 840, receive the Channel Quality Index (CQI), if available. At step 845, receive the Primary channel Matrix Index (PMI). At step 850, design multi-user precoder V(t) for simultaneous transmission of multiple streams to multiple users.

It is also possible to combine all the mentioned scheme and generate a transmission matrix X(t) that is a linear combination of $X_a(t)$, $X_b(t)$, $X_c(t)$, and $X_d(t)$ by properly choosing weight to control the transmission power of each code in the superposition code.

The transmission of the subsequent packets 3, 4, . . . , p−1 will be similar to the transmission of the second packet. The last packet, however, may be transmitted without encoding any new information and could be solely dedicated to transmission of the old data to allow a simpler interference cancellation. It is also possible to encode new data and superimpose it in the last packet transmission by means of multi-user precoding using anticipated channel state information in the last packet transmission. Since the knowledge of the current channel state is used, it is more likely to achieve a reasonable rate and good decoding performance in the last stage. Nonetheless, the use of new information in the encoding process without knowledge of the current channel state usually hurts the decoding process because there is no possibility of sending more packets to enable repercussive coding of this new information.

A description will now be given of exemplary codes, in accordance with an embodiment of the present principles.

It is important to minimize the time delay in providing the feedback information. Hence, in two-user channels with 2 transmit antennas and 1 receive antenna per users, it is better to transmit a linear combination of four symbols in the first time slot and then provide the interference information in the next two time slots.

A description will now be given of channel estimation and feed forward, in accordance with an embodiment of the present principles.

The use of repercussive coding may require some knowledge of the feedback signal to be provided in the forward channel. Due to causality, the information received in the past time slots could be provided in the future time slots in form of a whole, part or a function of the past received signals.

In particular, multi-user systems employing repercussive coding may require the information about the signal or the channel of other users, e.g., received through feedback channels, to be shared with other users. Since forwarding this information is in essence different from the encoding process, it is called "feed forward". The benefit and overhead of the feed forward has to be carefully considered in the system design.

If the channel coherence time is long, the feedforward overheard can be reduced by sending feedforward information less frequently. Nonetheless, the benefit of repercussive coding might reduce and simpler schemes such as multi-user precoding or multicast precoding might provide more pronounced gain. If the channel coherence time is also too short (in comparison to the symbol duration), the channel might change during the transmission of one packet and hence the channel change has to be considered in the coding. Therefore, the most favorable case is when the channel coherence time spans at least one packet or a few packets. The frequency of feedforward then depends on the channel coherence time and usually it is once per channel coherence time.

When quantized feedback is used, the codebook used for channel feedback should have enough resolution. For 4 transmit antennas, the codebook size of 6 to 12 bits is normally sufficient. It is also possible to use analog feedforward signaling instead of directly modulating and transmitting the feedforward channel in the forward link. In analog feedforward, e.g., when Orthogonal Frequency Division Multiplexing (OFDM) is used, we directly regenerate the channel of other users and send it in one or more OFDM tones. The users then recover the channel of all users from an individual or a combined set of feedforward signals. It should be noted that the resolution of the feedforward signals might be different from the transmitted data symbols. For example, if Quadrature Phase Key Shifting (QPSK) modulation is used, a 12 bit feedforward translates to 6 symbols for each of the resource blocks. This is equivalent of one OFDM tone in a resource block in Long Term Evolution (LTE) where a resource block spans 6 OFDM symbols and 12 or 24 OFDM tones.

The pilot requirement for employing channel estimation for the purpose of repercussive coding is also an important issue. There are two major components that affect the quality of the channel state information at the transmitter when quantized feedback is used. One component is the codebook size that was discussed earlier. The other component is the channel estimation error at the receiver that is directly a function of the quality and the number of pilot signals. Usually, a denser pilot signal has to be employed for the purpose of the channel estimation when repercussive coding is used since the knowledge of channel affects the system performance in two ways. First, the channel feedback is used to generate the cancelling signal and it would not efficiently cancel the interference signal when the received signal is combined with the prior packets and the residual channel estimation error might adversely affect the performance. Second, imprecise channel state information at the receivers will affect the demodulation and decoding performance similar to that of a conventional system.

The pilot signals for the purpose of channel estimation are usually non-dedicated pilots, because, it can be used by multiple users to estimate the channel concurrently in the same time slot and only with one set of pilot signals. Also, if dedicated and precoded pilot signals are used, then the estimation error in the past time slot adversely effects the estimation error in the current time slot. Hence, it is usually desirable to minimize the number of dense pilot transmissions. For example, in repercussive coding to two users, it is possible to send one set of dense pilot signals along with multiple stream transmissions to both users in the first time slot and in the subsequent time slots send the interference seen by each user to both users. Therefore, only one set of dense pilot signals in the first time slot is required. On the other hand, it is possible to send streams for the first user in the first time slot and streams for the second user in the second time slot and then send the combined interference in the third time slot. In such a case, we need to transmit two sets of dense pilot signals in the first and second time slots where the users have to accurately estimate the channel. Therefore, although theoretically both schemes can be made equivalent, in terms of the pilot overhead the former scheme is less costly than the latter scheme.

When the channel state information for the current slot is not available or is not accurate enough, it is usually beneficial to only use common (non-dedicated) pilot signals. However, the use of a dedicated pilot versus a common pilot in repercussive coding where both current and old channel state information is available depends on the particular system design. By using non-dedicated pilots it is possible to use any precoding, e.g., regularized zero forcing precoding, in the transmission of new data or part of the interference signal, while if a common pilot is used, it is required to signal the precoder or index from a codebook to the users for the purpose of decoding. Meantime, the use of a dedicated pilot signal affects the channel estimation for the current time slot and the feedback signal that is possibly generated from it. In some situation. e.g., in the last transmission slot or where no feedback is generated in the current time slot, it is possible to use a dedicated pilot and employ its benefit without affecting the entire performance of repercussive coding.

In some systems, it possible to avoid or reduce the feedforward overhead. For example, in a single link system that employs multiple antennas it might be convenient to use single stream decoding for all the streams that are transmitted jointly to a user instead of joint decoding of all the streams. In such cases, the channel state information will be available at the destination for all received streams and it can be used for the decoding of each stream if a repercussive coding is used. In other cases, e.g., when multicarrier or OFDM system is used, the channel of different subcarriers or OFDM tones is available at the receiver and it can be used in lieu of feedforward information.

Thus, in accordance with the present principles, we have proposed a new coding scheme referred to herein as repercussive coding. One of the novelties of the present principles lie on the introduction of an artificial channel having parameters that can be adjusted based on the quantized channel state information available through feedback. This highlights the difference between the present principles and the prior art scheme where they either assume perfect knowledge of the prior channel state is available at the transmitter or they assume a quantization of the channel output is available. The quantization of the channel output has to be performed usually at much higher rate than the quantization of the channel itself.

It is also discussed that the rate of the code and modulation scheme has to be decided before the transmission of each packet. While prior works have ignored this selection process, we propose the selection of a coding and modulation scheme (MCS) based on the channel quality index. It is noted that the channel quality index does not directly map to the MCS by a look-up table as it is done conventionally in current communication systems. Rather, the selection process envisions the future of the channel and the coding scheme involved in making the decision at each step. In particular, the MCS selection considers the current CQI and uses different error thresholds in different stages of the packet transmission. The error threshold in early stages of the packet transmission is higher, allowing for more aggressive channel use and, as the packet transmission gets closer to the end of a series of packet transmissions, the error threshold becomes smaller, allowing for recovery of the last packet and successful interference cancellation and decoding of all prior packets.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method performed by a transmitter in a multi-user communication system, comprising:
   transmitting a first part of a codeword to a plurality of receivers over a communication channel in a transmission;
   receiving feedback on the transmission of the first part of the codeword;
   providing an artificial channel having channel parameters adjustable responsive to the received feedback;
   virtually feeding the artificial channel with the first part of the codeword to generate artificial channel output data;
   encoding a second part of the codeword for transmission to the plurality of receivers over the communication channel responsive to the artificial channel output data; and
   transmitting the encoded signals to the plurality of receivers over the communication channel.

2. The method of claim 1, further comprising selecting a channel coding and modulation scheme for the second part of the codeword responsive to a Channel Quality Index, wherein said encoding step encodes the second part of the codeword using the selected coding and modulation scheme.

3. The method of claim 2, wherein said selecting step selects the coding and modulation scheme responsive to an average Channel Quality Index relating to the plurality of receivers.

4. The method of claim 2, wherein the codeword is transmitted using a multi-stage transmission scheme that transmits different codeword parts in different transmission stages, and said selecting step selects the coding and modulation scheme using different error thresholds for the different transmission stages.

5. The method of claim 2, further comprising receiving, from at least one of the plurality of receivers, a Primary channel Matrix Index responsive to the at least one of the plurality of receivers quantizing the communication channel, and wherein the Primary channel Matrix index is used for selecting a coding and modulation scheme for a subsequent transmission by the transmitter.

6. The method of claim 1, wherein the artificial channel comprises a plurality of outputs, each corresponding to an interference encountered by a respective one of the plurality of receivers.

7. The method of claim 6, wherein said transmitting step transmits the codeword using a multi-stage transmission scheme that transmits different codeword parts in different transmission stages, at least some of the different transmission stages depending on interference signals from a respective previous one of the different transmission stages.

8. The method of claim 6, further comprising receiving a transmission of at least one of the interference signals having additional non-interference data added thereto.

9. The method of claim 1, further comprising:
   receiving at least one of signal information and channel information as the feedback via the artificial channel; and
   sharing the at least one of signal information and channel information among at least some of the plurality of receivers.

10. The method of claim 9, further comprising adapting a transmission frequency of the at least one of the signal information and the channel information responsive to an amount of channel coherence between a plurality of portions of the communication channel respectively corresponding to each of the plurality of receivers.

11. The method of claim 1, further comprising performing channel estimation using one or more non-dedicated pilot signals.

12. The method of claim 1, wherein the one or more non-dedicated pilot signals are transmitted only during a first time slot or during the first time slot and a second time slot, in a multi-slot transmission spanning a plurality of time slots, the plurality of time slots having more than the first time slot and the second time slot.

13. The method of claim 1, further comprising performing channel estimation using one or more common pilot signals responsive to an unavailability or a lack of accuracy of feedback-provided quantized channel state information for a current time slot.

14. A non-transitory computer readable medium configured with instructions for a computer to perform the steps of claim 1.

15. An apparatus in a multi-user communication system, comprising:
- a transmitter for transmitting a first part of a codeword to a plurality of receivers over a communication channel in a transmission;
- an artificial channel generator for receiving feedback on the transmission of the first part of the codeword, providing an artificial channel having channel parameters adjustable responsive to the received feedback, and virtually feeding the artificial channel with the first part of the codeword to generate artificial channel output data; and
- an encoder for encoding a second part of the codeword for transmission to the plurality of receivers over the communication channel responsive to the artificial channel output data.

16. The apparatus of claim 15, wherein the apparatus further comprises:
- a modulator for modulating the at least the second part of the codeword; and
- a modulation and coding scheme selector for selecting a channel coding and modulation scheme for the second part of the codeword responsive to a Channel Quality Index, wherein said encoder and said modulator respectively encode and modulate the second part of the codeword using the selected coding and modulation scheme.

17. The apparatus of claim 16, wherein the transmitter transmits the codeword using a multi-stage transmission scheme that transmits different codeword parts in different transmission stages, and the coding and modulation scheme is selected using different error thresholds for the different transmission stages.

18. The apparatus of claim 15, wherein the artificial channel comprises a plurality of outputs, each corresponding to an interference encountered by a respective one of the plurality of receivers.

19. The apparatus of claim 18, wherein said transmitter transmits the codeword using a multi-stage transmission scheme that transmits different codeword parts in different transmission stages, at least some of the different transmission stages depending on interference signals from a respective previous one of the different transmission stages.

20. The apparatus of claim 15, wherein the transmitter receives at least one of signal information and channel information as feedback via the artificial channel, and shares the at least one of signal information and channel information among at least some of the plurality of receivers.

* * * * *